United States Patent Office 3,476,731
Patented Nov. 4, 1969

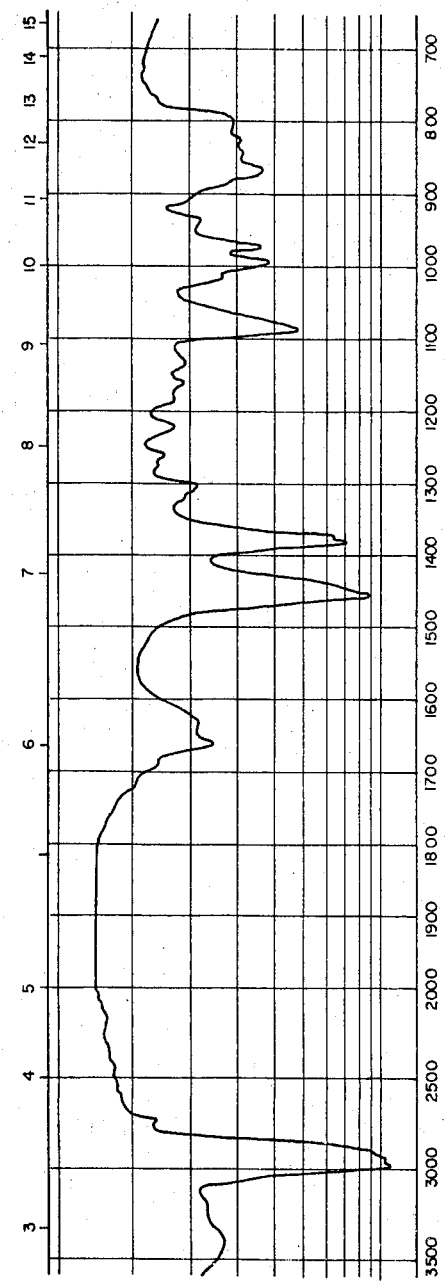

3,476,731
STEREOSPECIFIC POLYMERIZATION OF 2-METHYL-1,3-PENTADIENE
Daniel Cuzin, Rueil-Malmaison, Yves Chauvin, Orsay, and Gilles Lefebvre, Rueil-Malmaison, France, assignors to Institut Francais du Petrole des Carburants et Lubrifiants, Rueil-Malmaison, France
Filed Mar. 6, 1967, Ser. No. 620,920
Int. Cl. C08d 3/04, 1/16
U.S. Cl. 260—94.2  10 Claims

ABSTRACT OF THE DISCLOSURE

The homopolymers of 2-methyl-1,3-pentadiene comprise at least 90% 1,4-trans units and more than 90% unsaturation; they are amorphous, elastomeric and exhibit intrinsic viscosities of at least 0.2 dl./g. in benzene at 30° C. They are manufactured from organohaloaluminum compounds.

---

This invention relates to a new process for stereospecifically polymerizing 2-methyl-1,3-pentadiene and to the homopolymer of high intrinsic viscosity, practically free of cyclisation, obtained by this process.

Poly (2-methyl-1,3-pentadiene) obtained in this process is a homopolymer which is essentially an open chain whereof at least 90% and more usually at least 95% of the elementary units of the chain, exhibit a 1,4-trans addition structure. It has outstanding elastomeric properties.

According to the prior art, it was known to copolymerize 2-methyl-1,3-pentadiene with other olefins or polyolefins, or, when this compound was used as sole monomer, there was used a catalytic system using both titanium tetrachloride and triisobutylaluminium, to obtain a homopolymer of low intrinsic viscosity.

The homopolymer is obtained, according to this invention, by contacting 2-methyl-1,3-pentadiene with a catalyst consisting essentially of an organic aluminum compound such as defined hereinafter, preferably with a low amount of added initiator such as defined hereafter.

The obtainment of acyclic poly (2-methyl-1,3-pentadiene) which further contains a high proportion of 1,4-trans units, by this process, constitutes an unobvious phenomenon since lower diolefins such as butadiene or isoprene give only, when subjected to organic aluminum compounds, with or without initiator, and without heavy metal compound, low amounts of polymer of low viscosity and poor stereospecificity. This highly cyclic polymer is a poor elastomer.

The advantage resulting from the process is thus evident since according to this invention, it is possible to prepare non-cyclic poly (2-methyl-1,3-pentadiene) which exhibits at least 95% of 1,4-trans structure and a high intrinsic viscosity, using the catalyst of this invention which is:

more simple thus cheaper than those prior known;
usually more active, which results in an increase in the yield of the reaction with respect to conventional processes;
often more specific. An increase of sterospecificity results in a corresponding increase in the physical properties of the vulcanized elastomer.

The catalyst of this invention contains essentially an organoaluminum compound of the following formulae:

$$AlR_2X \text{ or } AlRX_2$$

wherein X is a halogen atom, preferably chlorine, bromine or iodine; R is a monovalent radical such as a hydrogen atom or a monovalent hydrocarbon radical containing about 1–30 carbon atoms, for example alkyl, alkenyl, cycloalkyl, cycloalkenyl, aryl, aralkyl, aralkenyl, one of the R radicals of $AlR_2X$ being optionaly an —OR' radical wherein R' is selected from the same group as R. Preferably these radiacls each contain 1–12 carbon atoms.

By way or examples, the following radicals may be mentioned: methyl, ethyl, n. propyl, isobutyl, n. pentyl, n. dodecyl, eicosyl, phenyl, naphthyl, tolyl (ortho, meta or para), xylyl, cyclopentyl, cyclohexyl, cyclodecyl, allyl, cyclohexenyl, cinnamyl, benzyl, methoxy, ethoxy, n. hexyloxy, allyloxy, cyclopentenyloxy, cinnamyloxy, phenoxy, benzyloxy, α-naphthyloxy, o. tolyloxy.

According to a preferred embodiment, there is used a diethylaluminum halide, preferably chloride.

$AlRX_2$ may be used alone or with added cocatalyst as hereinafter defined; conversely the cocatalyst cannot be used alone but requires $AlR_2X$.

The cocotalyst or initiator may be defined as any element which gives a proton or a carbocation when contacted with an alkyl-aluminum halide.

There will be particularly mentioned the Bronstedt acids, i.e. all compounds which may dissociate into a hydrocarbon ion and an electronegative radical, for example the conventional inorganic or organic acids, phenols and water.

As other examples of initiators, there will be mentioned tertiary alcohols, organic hydroperoxides, halogens, secondary and, above all, tertiary alkyl halides and preferably tertiobutyl chloride, whereof the activating power is outstandingly high.

The initiator amount may vary broadly. For example there may be used from 0.1 to 100 gram-molecules for 100 gram-atoms of aluminum of the organoaluminic compound. However values comprised between 10 and 50 gram-molecules are preferred. Beyond 100 gram-molecules of initiator, the catalytic activity becomes poor to null.

As examples of organic initiators containing for example 4–30 carbon atoms per molecule, there will be mentioned: tert. butanol, 2-methyl-2-octanol, tert. butyl hydroperoxide, cumene hydroperoxide, ethylbenzene hydroperoxide, tertiobutyl chloride, phenol, cresols, acetic acid, trichloracetic acid, malonic acid, benzenesulfonic acid, and picric acid.

Those which contain 1–30 carbon atoms per molecule are preferred.

As examples of mineral initiators, the following will be mentioned: chlorine, bromine, hydrogen chloride, hydrogen fluoride, hydrogen bromide, sulfuric acid, water.

The cocatalyst will be contacted with the catalyst only in the presence of the monomer.

The amount of organoaluminum compound is not limitative; it will be comprised for example between 0.001 and 20% molar with respect to the monomer.

The polymerization of 2-methyl-1,3-pentadiene may be carried out in bulk or preferably in solution. The solvent may be for example a saturated paraffinic hydrocarbon (with open-chain or cyclic), an aromatic hydrocarbon, a primary alkyl halide or an aryl halide.

As specific examples of these solvents, the following will be named:

pentane, hexane, heptane, octane and cyclohexane,
benzene, toluene, xylenes
methyl chloride, ethyl chloride and chlorobenzene.

The monomer concentration may vary between broad limits since the polymerization may be carried out as well in bulk as in solution. It will be preferably higher than 0.1 mole of monomer per mole of solvent.

The polymerization temperature will be usually comprised between −170° C. and +100° C., however lower temperatures are preferred, for example −160° to 0° C., in order to have the highest intrinsic viscosities.

An increase of temperature, if it speeds up the reaction, tends to diminish the average molecular weight of the resulting polymer.

It is of importance to carry out the polymerization under an inert atmosphere, and to dry at least partly the reactance by any known process.

When the initiator is water, it is advantageous to introduce it in desired quantity as benzene (or any other inert organic liquid) previously saturated with water.

The obtained polymer is an outstanding elastomer, contrary to trans polybutadiene or trans polyisoprene which do not exhibit these properties.

Thus it can be used in the same way as the conventional diolefinic elastomers. It can be in particular vulcanized, for example by means of sulfur, and/or conventional additives for rubber may be admixed therewith.

The infra-red spectrum of the polymer is given on the accompanying drawing.

Briefly stated, the invention is concerned with homopolymers of 2-methyl-1,3-pentadiene, characterized by an intrinsic viscosity of at least 0.2 dl./g. and preferably at least 0.6 dl./g., as measured in benzene at 30° C., and by a content of at least 90%, preferably at least 95%, 1.4-trans units; they are amorphous as examined under X-rays and do not exhibit appreciable cyclization as examined by nuclear magnetic resonance.

The invention also concerns compositions containing the above poly (2-methyl-1,3-pentadiene) together with at least one conventional additive of vulcanizable rubber such as hevea rubber, selected particularly among plasticizers (for example pentachlorthiophenol, xylylmercaptides, $\beta$-thionaphthol), vulcanization agents (for example sulfur, about 0.5 to 10% by weight, or a corresponding amount of sulfur chloride), vulcanization accelerators (for example diphenylguanidine, 2-mercaptobenzothiazol, zinc dimethyldithiocarbamate), oxidation inhibitors (for example 4.4′-dihydroxybiphenyl or 2-mercaptobenzimidazol), hardening agents, fillers (for example carbon black, silica, zinc oxide), dyes and the like.

For a more detailed description of additives, reference is made to Ullmann, Encyklopädie der technischen Chemie, vol. 9, pp. 380–407 (1957).

The polymer of this invention may be also admixed with other polymers, elastomeric or not elastomeric, for example with polybutadiene, polyisoprene, polyacrylonitrile and polyisobutylene.

In these compositions, the amount of homopolymer of 2-methyl-1,3-pentadiene is usually comprised between 10 and 95% by weight, more preferably between 50 and 70%.

The following non-limitative examples are given by way of illustration:

Example 1

In a reaction vessel, maintained at 0° C. under argon atmosphere, there is introduced:

40 ccm. benzene
3.58 g. (44 millimoles) of 2-methyl-1.3-pentadiene
1.2 mmole Al(C$_2$H$_5$)$_2$Cl
8 ccm. of benzene saturated with water (0.24 mmole water).

A yellow coloration develops and an increase of viscosity is observed. The reaction is very fast.

2.5 g. of transparent poly (2-methyl-1,3 pentadiene) are obtained, which is amorphous under X-rays and elastomeric, and exhibits an intrinsic viscosity of 0.4 dl./g. as measured in benzene at 30° C. (the same method is used in all examples).

The microstructure, as determined by nuclear magnetic resonance and infra-red spectrometry, corresponds to 95% 1.4-trans units and 5% 1,2-units. The unsaturation rate is practically 100%.

The yield of polymer is 70%.

Example 1A

The same reaction carried out exactly under same conditions, except that isoprene was used as starting material, gives 0.7 g. of non-elastomeric polymer, i.e. a yield of 20%.

Example 2

Example 1 is repeated except that 40 ccm. of heptane are used instead of benzene.

The weight of monomer is 3.75 g. The amounts of diethylaluminum chloride and water are unchanged. The temperature is 20° C.

2.64 g. of amorphous polymer are obtained, with a 70% yield.

This polymer exhibits an intrinsic viscosity of 0.45 dl./g. (as measured at 30° C. in benzene) and its microstructure is the same as that of the polymer obtained in Example 1, i.e. 95% 1.4-trans units, 5% 1.2-units and 100% insaturation.

Example 3

There is introduced into a glass reactor maintained at 25° C. under argon atmosphere:

10 ccm. benzene
3.58 g. (44 mmoles) 2-methyl-1,3-pentadiene
0.4 ccm. (1.2 mmole) Al(C$_2$H$_5$)Cl$_2$
0.24 m. mole water.

When the polymerization is finished, 2 ccm. methanol and 50 mg. oxidation inhibitor (N-phenyl-$\beta$-naphthylamine) are added.

A polymer exhibiting substantially the same properties as in Examples 1 and 2 is obtained.

Example 4

Into a glass vessel maintained at 25° C. under argon inert atmosphere, there is introduced:

10 ccm. benzene
5 ccm. 2-methyl-1,3-pentadiene (44 mmoles)
1.2 mmole Al(C$_2$H$_5$)$_2$I, i.e. 0.15 ccm.

After 30 minutes of slow agitation, there is added 8 ccm. benzene saturated with water (0.24 mmole).

The polymerization is stopped by adding 3 ccm. isopropanol; then the polymer is dissolved in benzene and the resulting solution is washed with acidified water. After evaporation of the solvent, 3.37 g. (94% yield) of a polymer are obtained, which exhibits substantially the same properties as in Examples 1 and 2.

Example 4A

The same reaction carried out exactly under the same conditions except that isoprene is used provides only for a viscous non-elastomeric wax with a yield of 12% with respect to the monomer.

Example 5

10 ccm. benzene, 5 ccm. 2-methyl-1,3-pentadiene (3.58 g.) and 1.2 mmole Al(OC$_2$H$_5$)(C$_2$H$_5$)Cl (0.19 ccm.) are introduced into a glass reactor maintained at 25° C. under argon atmosphere.

4 ccm. of benzene saturated with water (0.12 mmole) are added thereto.

The polymerization is stopped by addition to the reaction medium of 5 ccm. methanol and thereafter an oxidation inhibitor (N-phenyl-$\beta$-naphthylamine).

After washing and evaporation, a polymer is obtained which exhibits substantially the same properties as in the previous examples. The yield is practically quantitative.

Example 5A

The same experiment carried out on isoprene provides for a viscous, non-elastomeric mass with a yield of 15% with respect to the monomer.

Example 6

20 ccm. heptane are admixed with 5 ccm. 2-methyl-1,3-pentadiene, 1.2 mmole Al(C$_2$H$_5$)$_2$Cl and 0.12 mmole water at −25° C.

2.92 g. of amorphous poly (2-methyl-1,3-pentadiene) are obtained, which comprises more than 95% 1,4-trans units and exhibits an intrinsic viscosity of 0.405 dl./g. and an unsaturation rate of about 100%.

Example 7

Example 6 is repeated at −80° C., except that 0.12 mmole tert. butyl chloride is used instead of water.

3.6 g. of polymer are obtained with an intrinsic viscosity of 0.7 dl./g. and the same structure as in Example 6.

Example 8

30 ccm. toluene are admixed with 4 ccm. 2-methyl-1,3-pentadiene, 0.8 m. mole chlorodiethylaluminum and 0.12 mmole tertiobutyl chloride at −80° C.

2.54 g. of polymer are obtained with the same structure as above and an intrinsic viscosity of 0.71 dl./g.

Example 9

10 ccm. anhydrous benzene are admixed at 25° C. with 5 ccm. 2-methyl-1,3-pentadiene and 0.4 ccm. di-chloroethylaluminium (1.2 m. mole) dissolved in heptane.

The polymerization is stopped by addition of 2 ccm. of methanol containing an oxidation inhibitor (N-phenyl-β-naphthylamine). A quantitative yield of poly (2-methyl-1,3-pentadiene) is obtained, with an intrinsic viscosity of 0.27, more than 90% trans units and 98% unsaturation.

Example 10

This example has for object to illustrate a rubbery composition according to this invention. There is admixed together:

|  | Grams |
|---|---|
| Poly (2-methyl-1,3-pentadiene) | 100 |
| Carbon black | 82 |
| Stearic acid | 1 |
| Zinc oxide | 6 |
| Sulfur | 3 |
| Dibenzothiazyl disulfide | 0.8 |
| Diphenylguanidine | 0.3 |
| β-Thionaphtol | 8 |

This mixture may be vulcanized at about 130–145° C. to give a vulcanized rubber exhibiting high mechanical properties.

As results from the above examples, the polymer of this invention is characterized by a content of at least 90% (preferably at least 95%) 1,4-trans units, an unsaturation ratio higher than 90% (preferably at least 98%), the practical absence of crystallinity under X-rays and an intrinsic viscosity of at least 0.2 dl./g. in benzene at 30° C.

This polymer is supple and elastomeric.

By way of comparison, a homopolymer of 2-methyl-1,3-pentadiene was prepared with a catalyst consisting of triisobutylaluminum and titanium tetrachloride, just as described in Example 66 of French Patent 1,139,418. A brittle polymer was obtained which exhibited only 70% unsaturation (whereof 9/10 of the 1,4-trans type).

In another comparative experiment, AlBr$_3$ was used as catalyst; the resulting poly (2-methyl-1,3-pentadiene) was brittle and contained only 50% unsaturation (whereof 9/10 of the 1,4-trans type).

These latter two polymers are poor elastomers.

What is claimed is:

1. Homopolymers of 2-methyl-1,3-pentadiene comprising at least 90% 1,4-trans units and more than 90% unsaturation, which are amorphous under X-rays and exhibit an intrinsic viscosity of at least 0.2 dl./g. in benzene at 30° C.

2. Homopolymers according to claim 1, further comprising at least 95% 1,4-trans units and at least 98% unsaturation with an intrinsic viscosity of at least 0.6 dl./g. in benzene at 30° C.

3. A process for converting 2-methyl-1,3-pentadiene into homopolymers as defined by claim 1, which process comprises contacting 2-methyl-1,3-pentadiene at a polymerization temperature of about −170° C. to +100° C., with a catalyst consisting essentially of
   (a) an organo-aluminum compound selected from the group consisting of AlRX$_2$ and AlR$_2$X, wherein X is halogen, and when the organo-aluminum compound represents AlRX$_2$, R represents a monovalent hydrocarbon radical, and when the organo-aluminum compound represents AlR$_2$X, at least one R-group is a monovalent hydrocarbon radical, and the other R-group is selected from the group consisting of a monovalent hydrocarbon radical and —O— monovalent hydrocarbon; and
   (b) a cocatalyst selected from the group consisting of water, a Brønsted acid having the strength of at least water, a tertiary alcohol, a phenol, an organic hydroperoxide, a secondary alkyl halogenide, a tertiary alkyl halogenide, or a halogen;
   wherein the ratio of gram molecules of said co-catalyst to the gram atoms of aluminum in said organo-aluminum compound is about 0.001:1 to 1:1.

4. A process as defined by claim 3, wherein the polymerization temperature is between about −160° C. and 0° C.

5. A process as defined by claim 3, wherein the ratio is 0.1:1 to 0.5:1.

6. A process according to claim 3, wherein the cocatalyst is tert. butyl chloride.

7. A process according to claim 3, wherein the organo-aluminum compound is AlRX$_2$.

8. A process according to claim 3, wherein the cocatalyst is water.

9. A process according to claim 6, wherein the cocatalyst is tert. butyl chloride.

10. A vulcanizable composition containing 10–95% by weight of poly (2-methyl-1,3-pentadiene) according to claim 1 and at least one vulcanization agent known for natural rubber.

References Cited

UNITED STATES PATENTS

| | | | |
|---|---|---|---|
| 2,406,575 | 8/1946 | Young et al. | 260—94.2 XR |
| 2,447,610 | 8/1948 | Calfee et al. | 260—94.2 XR |
| 2,989,504 | 6/1961 | Little | 260—94.2 XR |
| 3,019,213 | 1/1962 | Moody | 260—94.2 |
| 3,161,628 | 12/1964 | Dost et al. | 260—94.9 |
| 3,349,065 | 10/1965 | Kennedy | 260—85.3 |

FOREIGN PATENTS

| | | |
|---|---|---|
| 471,408 | 2/1951 | Canada. |
| 491,753 | 3/1953 | Canada. |
| 497,857 | 11/1953 | Canada. |

OTHER REFERENCES

Journal of Polymer Science 53, 212 (1961), "Factors Causing Chain Structure Change," by Dolgoplosk et al.

JOSEPH L. SCHOFER, Primary Examiner

W. F. HAMROCK, Assistant Examiner

U.S. Cl. X.R.

260—94.3, 94.7, 95, 96